United States Patent
Robertson et al.

(10) Patent No.: US 8,225,311 B1
(45) Date of Patent: *Jul. 17, 2012

(54) DEPLOYING AND DISTRIBUTING CONTENT MANAGEMENT CODE

(75) Inventors: Don Robertson, Pleasanton, CA (US); Meir Amiel, Pleasanton, CA (US); Victor Spivak, San Mateo, CA (US)

(73) Assignee: EMC Corporation, Hopkinton, MA (US)

( * ) Notice: Subject to any disclaimer, the term of this patent is extended or adjusted under 35 U.S.C. 154(b) by 1393 days.

This patent is subject to a terminal disclaimer.

(21) Appl. No.: 11/430,491

(22) Filed: May 8, 2006

Related U.S. Application Data

(60) Provisional application No. 60/787,443, filed on Mar. 30, 2006.

(51) Int. Cl.
*G06F 9/44* (2006.01)
*G06F 9/445* (2006.01)

(52) U.S. Cl. ........ 717/177; 717/168; 717/169; 717/170; 717/171; 717/172; 717/173; 717/174; 717/175; 717/176; 717/178

(58) Field of Classification Search ........................ None
See application file for complete search history.

(56) References Cited

U.S. PATENT DOCUMENTS

| | | | |
|---|---|---|---|
| 5,845,077 A | 12/1998 | Fawcett | |
| 5,873,086 A * | 2/1999 | Fujii et al. | 1/1 |
| 6,151,643 A | 11/2000 | Cheng et al. | |
| 6,279,030 B1 * | 8/2001 | Britton et al. | 709/203 |
| 6,374,243 B1 * | 4/2002 | Kobayashi et al. | 707/703 |
| 6,584,612 B1 * | 6/2003 | Mueller et al. | 717/166 |
| 6,684,383 B1 * | 1/2004 | Natori et al. | 717/107 |
| 6,711,557 B1 | 3/2004 | Palaniappan | |
| 6,874,010 B1 | 3/2005 | Sargent | |
| 6,889,227 B1 * | 5/2005 | Hamilton | 1/1 |
| 7,047,518 B2 * | 5/2006 | Little et al. | 717/108 |
| 7,080,361 B2 * | 7/2006 | Aigen | 717/137 |
| 7,117,491 B2 | 10/2006 | Ferreira Alves et al. | |
| 7,181,731 B2 | 2/2007 | Pace et al. | |
| 7,350,185 B2 * | 3/2008 | Sparago et al. | 717/101 |
| 7,350,186 B2 * | 3/2008 | Coleman et al. | 717/103 |
| 7,370,322 B1 * | 5/2008 | Matena et al. | 717/171 |
| 7,493,613 B2 | 2/2009 | D'Souza et al. | |
| 7,506,308 B2 * | 3/2009 | Woollen et al. | 717/120 |
| 7,519,964 B1 * | 4/2009 | Islam et al. | 717/177 |
| 7,822,836 B1 | 10/2010 | Saparoff | |
| 2001/0054087 A1 | 12/2001 | Flom et al. | |
| 2002/0184226 A1 | 12/2002 | Klicnik et al. | |
| 2003/0182651 A1 * | 9/2003 | Secrist et al. | 717/120 |
| 2003/0182652 A1 * | 9/2003 | Custodio | 717/122 |
| 2003/0237081 A1 | 12/2003 | Taylor | |
| 2004/0031030 A1 * | 2/2004 | Kidder et al. | 717/172 |

(Continued)

OTHER PUBLICATIONS

JAVA™, Java Web Start Technology, http://java.sun.com/products/javawebstart/.

(Continued)

*Primary Examiner* — Insun Kang
(74) *Attorney, Agent, or Firm* — Van Pelt, Yi & James LLP

(57) ABSTRACT

Deploying and distributing content management code is disclosed. A software object class is received at a repository. The software object class is stored at the repository. The software object class is downloaded from the repository to an application server associated with the repository.

18 Claims, 12 Drawing Sheets

U.S. PATENT DOCUMENTS

| | | | |
|---|---|---|---|
| 2004/0068516 A1 | 4/2004 | Lee et al. | |
| 2004/0078495 A1 | 4/2004 | Mousseau et al. | |
| 2004/0133444 A1* | 7/2004 | Defaix et al. | 705/1 |
| 2004/0162724 A1 | 8/2004 | Hill et al. | |
| 2004/0215789 A1* | 10/2004 | Lu | 709/229 |
| 2004/0261126 A1 | 12/2004 | Addington et al. | |
| 2005/0044531 A1* | 2/2005 | Chawla et al. | 717/122 |
| 2005/0108702 A1* | 5/2005 | Baker et al. | 717/168 |
| 2005/0125809 A1* | 6/2005 | Chessell | 719/318 |
| 2005/0267918 A1 | 12/2005 | Gatev et al. | |
| 2005/0278278 A1 | 12/2005 | Petev et al. | |
| 2006/0015839 A1* | 1/2006 | Owens et al. | 717/100 |
| 2006/0015881 A1* | 1/2006 | Polozoff | 719/330 |
| 2006/0036993 A1* | 2/2006 | Buehler et al. | 717/104 |
| 2006/0037030 A1* | 2/2006 | Kovachka-Dimitrova et al. | 719/328 |
| 2006/0048097 A1* | 3/2006 | Doshi | 717/120 |
| 2006/0053410 A1* | 3/2006 | Charisius et al. | 717/109 |
| 2006/0074994 A1 | 4/2006 | Smits | |
| 2006/0130038 A1* | 6/2006 | Claussen et al. | 717/168 |
| 2006/0206890 A1* | 9/2006 | Shenfield et al. | 717/174 |
| 2006/0288111 A1* | 12/2006 | Katinsky et al. | 709/228 |
| 2006/0288300 A1 | 12/2006 | Chambers et al. | |
| 2007/0006212 A1* | 1/2007 | Kawamoto | 717/170 |
| 2007/0016893 A1* | 1/2007 | Branda et al. | 717/127 |
| 2007/0136242 A1 | 6/2007 | Auvenshine et al. | |
| 2007/0136479 A1* | 6/2007 | Miller | 709/227 |
| 2007/0198684 A1* | 8/2007 | Mizushima | 709/223 |

OTHER PUBLICATIONS

JAVA™, Web Start Overview, White Paper, May 2005.
Gruber et al., The Eclipse 3.0 Platform: Adopting OSGi Technology, IBM Systems Journal, vol. 44, No. 2, 2005.
OSGi™ Alliance, About OSGi Service Platform, Technical Whitepaper, Revision 3.0, Jul. 12, 2004.

* cited by examiner

DEPLOYING AND DISTRIBUTING CONTENT MANAGEMENT CODE

CROSS REFERENCE TO OTHER APPLICATIONS

This application claims priority to U.S. Provisional Patent Application No. 60/787,443 entitled Deploying and Distributing Content Management Code, filed Mar. 30, 2006, which is incorporated herein by reference for all purposes.

BACKGROUND OF THE INVENTION

Content management systems have been provided that enable a developer to develop custom applications that use and/or access content stored in an associated content repository. An example of such a system is an application server on which a content management framework and/or platform has been installed. The framework/platform includes a set of reusable components each preconfigured to perform a content management function or operation that an application developer may desire his/her application to perform. However, from time to time the need may arise to update the set of components, e.g., to install and deploy new/updated components developed by the content management system/application vendor, to deploy custom components developed by a content management system user and/or a third party developer, and to ensure that two or more application servers deployed at different times are all using the same version of the components. Therefore, there is a need for an effective way to deploy and update content management code.

BRIEF DESCRIPTION OF THE DRAWINGS

Various embodiments of the invention are disclosed in the following detailed description and the accompanying drawings.

DETAILED DESCRIPTION

Figure 1:
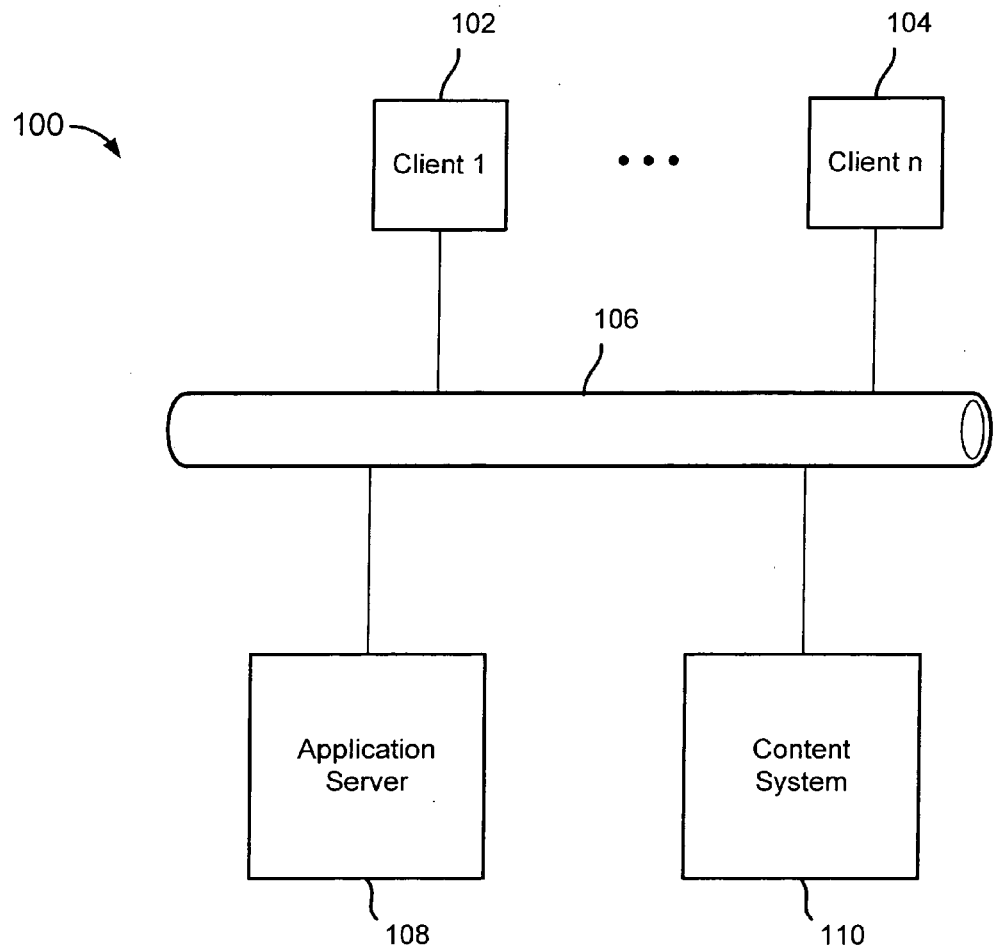
FIG. 1 is a block diagram illustrating an embodiment of a system for accessing and using managed content.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Deploying and distributing content management code from a repository is disclosed. In some embodiments, business logic (e.g., business object classes) and/or other code is registered with a repository. For example, in some embodiments, one or more business object classes comprising a content management framework are registered with a repository. The classes are stored in a content store and associated registration data is stored in a metadata store. Upon request from an application server, one or more business object classes are downloaded to the application server. As updates, if any, are registered at the repository, in some embodiments a change record in the repository is updated. An application server checks the change record periodically to determine if new/updated business object classes have been registered at the repository. In some embodiments, the change record is a global change record set to a value indicating that a new or updated class has been registered, without implicitly or explicitly identifying which classes have changed. In some embodiments, class (or collection of class, e.g., .jar) specific change records and/or flags or other indicator reflect whether individual classes have changed. In some embodiments, upon noting a change by reading a global change record, an application server iterates through the classes it has downloaded previously and/or otherwise needs and/or anticipates needing, checking for each the class and/or collection-specific change data/indicator, and downloading any classes that have changed since they were last downloaded to the application server. In some embodiments, new and/or updated classes are "hot deployed" without requiring that the application server be restarted. In some embodiments, hot deployment includes deploying an updated class and using the updated class to instantiate subsequently-requested instances of a business object while retaining the superseded class as long as it is still necessary, e.g., so long as at least one business object instance instantiated based on the superseded class is still actively being used (e.g., has at least one reference to it).

FIG. 1 is a block diagram illustrating an embodiment of a system for accessing and using managed content. One or more clients, represented in the example shown in FIG. 1 by client 102 and client 104, communicate via a network 106, such as a local area network (LAN), with an application server 108, e.g., to access and use an application running on application server 108. In some embodiments, application server 108 hosts one or more applications running on a content management framework or platform associated with managed content to which access is provided via a content system 110. In the example shown, application server 108 communicates via network 106 with content system 110 to access and/or store content items associated with content system 110. In some embodiments, content system 110 is configured to store and/or manage one or more logical repositories (e.g., document bases), each comprising an associated body of content items. In some embodiments, more than one application server 108 may be configured to access and/or use a single content system, such as content system 110, and/or a single repository. In some embodiments, content system 110 comprises a single content server installation capable of being configured to host one or more content server instances, each content server instance being configured to support one repository. In some embodiments, a repository may be spread across multiple content server instances and/or installations, but each content server instance is associated with only one repository.

Figure 2A:
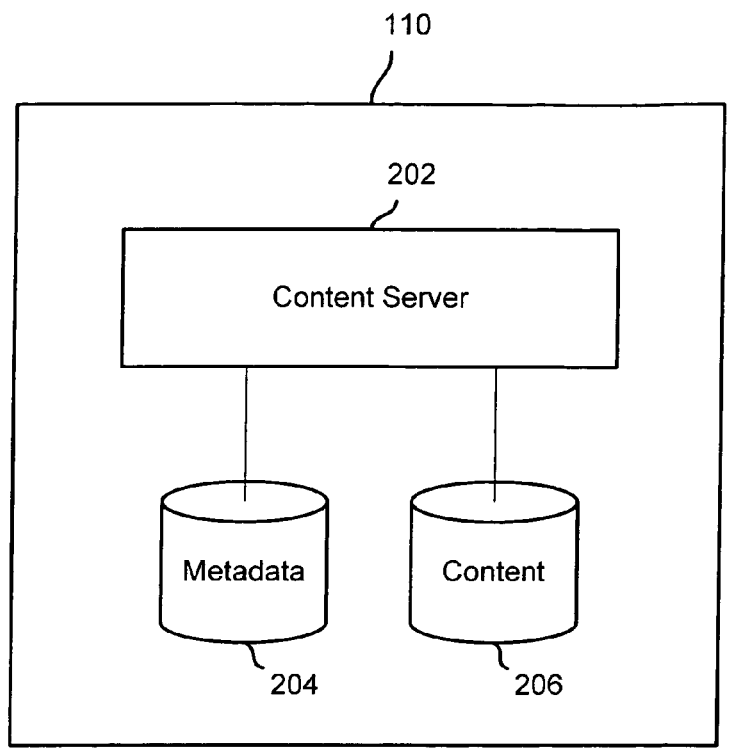
FIG. 2A is a block diagram illustrating an embodiment of a content system.

FIG. 2A is a block diagram illustrating an embodiment of a content system. In the example shown, content system 110 includes a content server 202 configured to provide access to and/or store content items, e.g., files, database tables, etc., stored in content store 206. In various embodiments, content server 202 and content store 206 reside on the same or different physical devices and/or systems, such as on separate servers or other computers. Content server 202 manages content items stored in content store 206 at least in part by associating with each of at least a subset of the content items stored in content store 206 corresponding metadata stored in metadata store 204. In some embodiments, the metadata is stored in the form of one or more software objects configured and used to represent an associated content item within a body of managed content. Examples of metadata include content item owner, author, title, date created, date last accessed, version, content type, file or data format, authoring application, recipient, sender, relationship to other content item(s), keyword(s), etc. In some embodiments, content server 202 uses the metadata to manage (e.g., track) and provide managed access to associated content items, e.g., by executing and returning results for metadata and/or full-text index based queries and providing content management functions such as check-in/check-out, versioning, save, delete, etc.

In some embodiments, one or more objects to represent a content item in metadata store 204 are created by and/or in response to a request from an application running on an associated content management framework (e.g., foundation classes, business logic, and/or API). For example, an application may populate and/or provided data values for metadata object attributes and/or provide the associated content and/or indicate to the content server a location (e.g., on the application server and/or an associated client) where the content is located. The content server stores the content in content store 206 and associates the content as stored in content store 206 with the corresponding metadata in metadata store 204.

Figure 2B:
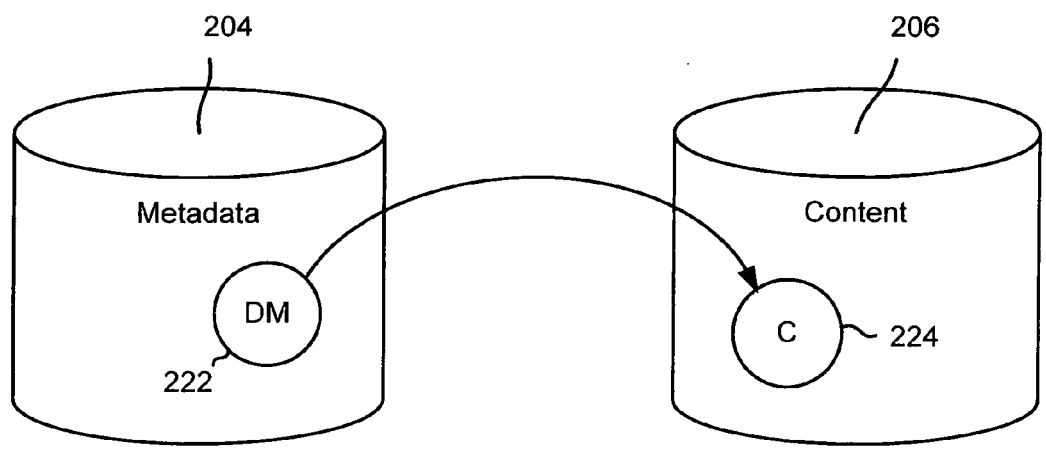
FIG. 2B is a block diagram illustrating an embodiment of elements associated with a content system.

FIG. 2B is a block diagram illustrating an embodiment of elements associated with a content system. In the example shown, an implementation object 222 stored in metadata store 204 is associated with a corresponding content item 224 stored in content store 206. The implementation object 222 represents the content item 224 in a body of managed content with which both are associated. FIG. 2B illustrates a simple example in which there is a one-to-one relationship between implementation object 222 and content item 224, but in some embodiments a single implementation object (or related set of objects) may be associated with two or more content items and/or a single content item may be associated with two or more implementation objects (e.g., to avoid duplicative storage of content).

In some embodiments, access to content item 224 and/or other content management functions are provided at least in part by invoking one or more methods and/or using one or more attributes of implementation object 222. In some embodiments, an application running on application server 108 of FIG. 1 invokes business logic on application server 108 to access or perform other operations with respect to content item 224 using one or more attributes and/or methods of implementation object 222. For example, in some embodiments an application on application server 108 invokes business logic (e.g., a service) on application server 108 to perform a metadata-based search of content system 110, e.g., to find content items that satisfy search criteria such as by author, date created, date modified, content type, document title, etc. Content system 110 searches metadata in metadata store 204 for implementation objects that satisfy the query, e.g., by checking attribute values of at least a subset of the objects, and returns results indicating any responsive content items. If the application receives an indication from a user that a particular result, such as content item 224, is desired to be retrieved, the application invokes other business logic which in turn invokes one or more methods of and/or uses one or more attributes of implementation object 222 to retrieve content item 224, e.g., a file or other object comprising content item 224.

Figure 3:
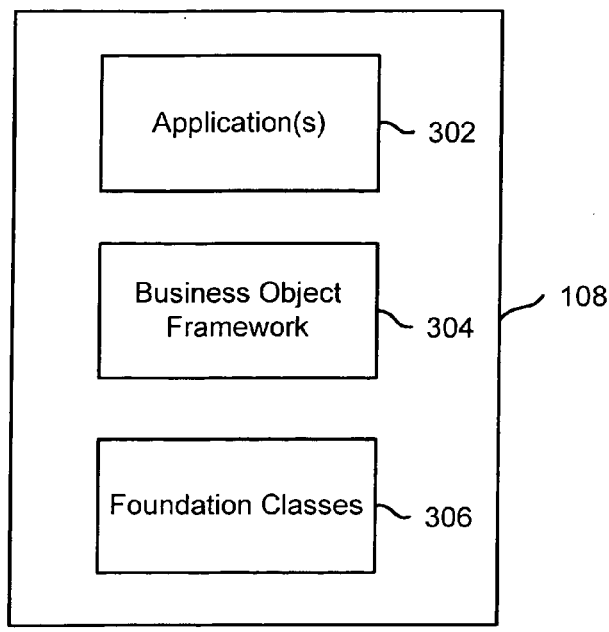
FIG. 3 is a block diagram illustrating an embodiment of an application server.

FIG. 3 is a block diagram illustrating an embodiment of an application server. In the example shown, application server 108 includes one or more applications 302 running on a content management framework comprising a business object framework 304 and foundation classes 306. The application(s) use(s) the business object framework 304 and/or foundation classes 306 to perform content management operations, such as storing, accessing, retrieving, organizing, searching for, checking in/out, and/or otherwise managing a body of content items using as applicable one or more software objects associated with business object framework 304 and/or comprising foundation classes 306. In some embodiments, foundation classes 306 comprises a set of system objects configured to represent items of content in a repository such as content system 110 and to provide access to and control and management of such content. In some embodiments, application(s) 302 make calls to business logic software objects comprising and/or associated with business object framework 304 and/or foundation classes 306, which instantiate and access runtime implementation objects on application server 108 and/or access persistently stored implementation objects stored on content system 110, as applicable, to perform desired content management operations. In some embodiments, business object framework 304 comprises a set of reusable, preconfigured components available to an application developer to perform content management functions and/or operations.

Figure 4:
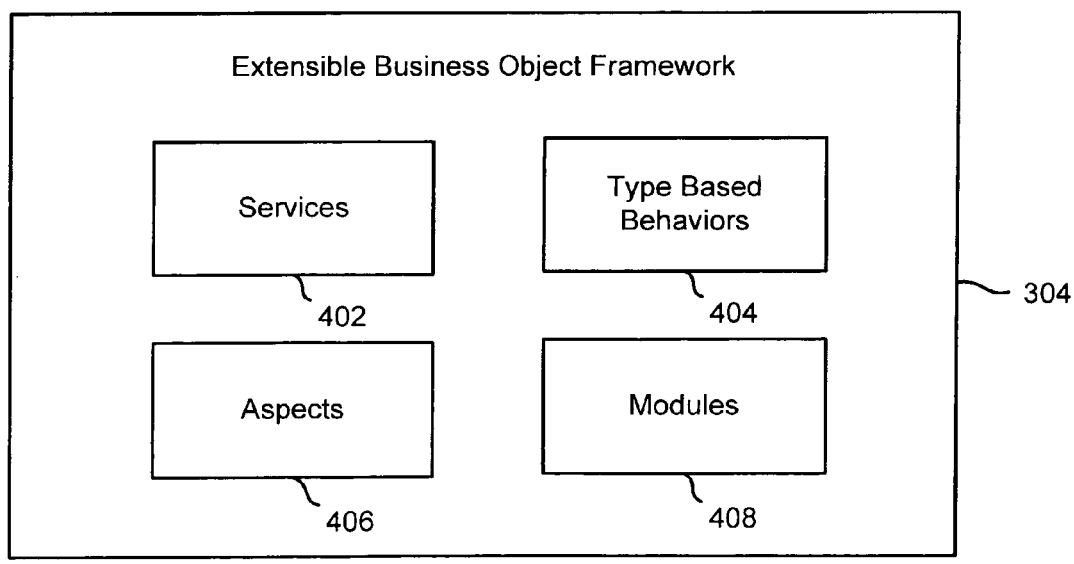
FIG. 4 is a block diagram illustrating an embodiment of an extensible business object framework.

FIG. 4 is a block diagram illustrating an embodiment of an extensible business object framework. In the example shown, business object framework 304 comprises an extensible business object framework that includes four categories of business objects and/or logic, including services 402, type based behaviors/objects 404, aspects 406, and modules 408. In some embodiments, services 402 comprises a set of service based objects available across one or more repositories and to one or more application servers associated with one or more repositories. Examples of services include retention policy services configured to enforce one or more retention policies to content items, as applicable. In some embodiments, type based behaviors 404 define and provide behaviors that are determined by content type. An implementation object instantiated to represent in metadata a content item of a type having one or more content type based behaviors associated with it is configured to provide the type-based behavior(s). Type based behaviors may include type-based methods, e.g., one or more type-based methods that override default document behaviors (e.g., save, checkout, etc.) or add new type-specific behavior (e.g., adding a "spell check" action to a contract). In some embodiments, a base implementation object is instantiated and modified dynamically (in place) to configure the implementation object to provide the type-based behaviors. In some embodiments, aspects 406 comprises one or more behaviors that can be attached optionally to one or more implementation object instances, across and/or within content types. In some embodiments, an aspect may be attached at instantiation of the implementation object or at a later point in time. Examples of an aspect include retention policy enforcement. For example, linking a content item to a retention folder or "vault" in some embodiments causes a retention aspect to be attached. The implementation object representing the content item is modified to provide additional behavior to ensure proper retention, e.g., by preventing, modifying, or redirecting calls to a "delete" method of the implementation object. Finally, modules 408 in some embodiments include one or more business objects comprising business logic applicable to and available to be invoked with respect to a single document (or other content) repository or "docbase", as opposed to being available across repositories, like a service. In some embodiments, type based behaviors 404, aspects 406, and modules 408 are extensible and an API is provided to enable third party developers to develop and deploy custom components.

From time to time the need may arise to update the object classes comprising a business object framework such as business object framework 304. Examples of circumstances requiring such an update include deployment of new components developed by a content management system vendor or new custom components developed by a third party developer contracted by an enterprise or other user of a content management system; updates to correct software bugs, security flaws, or other problems with one or more business object classes; and the need to ensure consistency across multiple application servers deployed at different times.

In some embodiments, business logic and other software objects comprising a content management system and/or framework are deployed in and distributed from a repository, such as content system 110. An application server, such as application server 108, downloads needed business object classes from the repository, and instantiates a required business object using the locally stored class definition downloaded from the repository. In some embodiments, a base set of business objects is downloaded in connection with initial deployment and/or redeployment of an application server. In some embodiments, new and/or updated business object classes are downloaded as such new and/or updated business object classes become available and/or the need for such classes arises and/or is anticipated.

Figure 5:
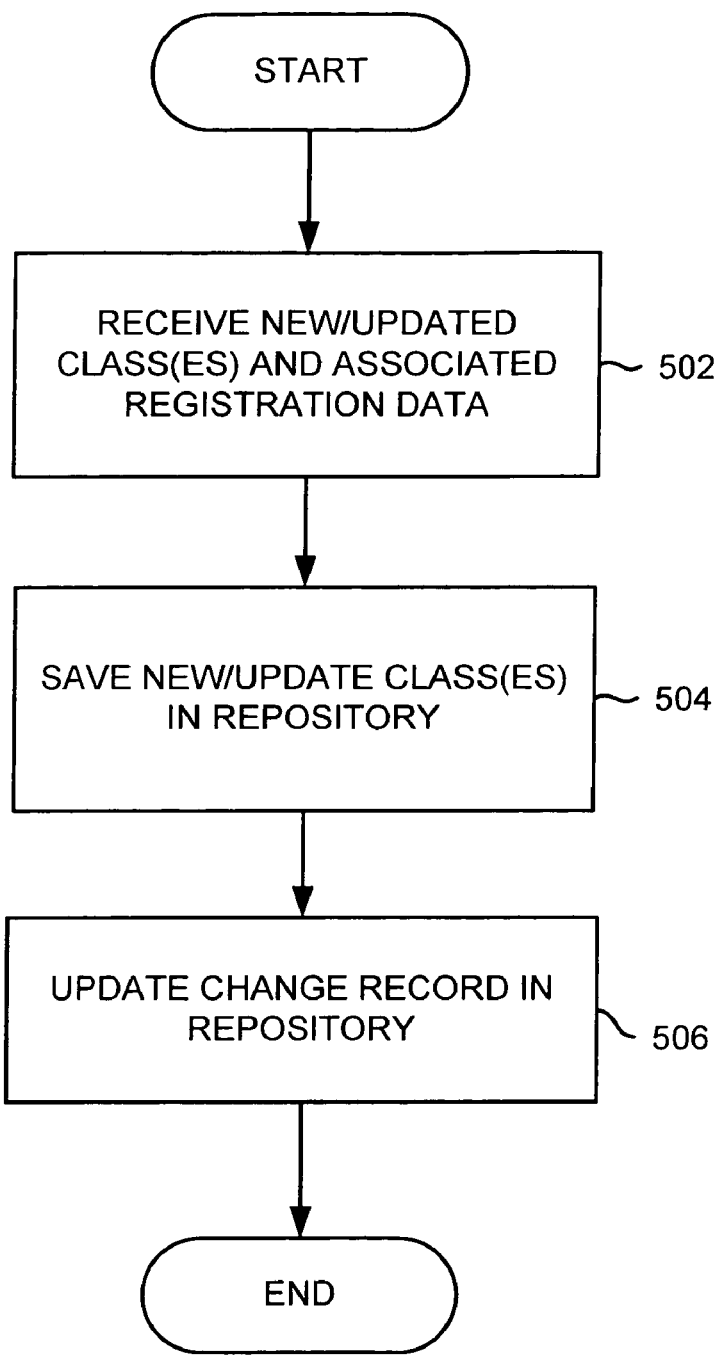
FIG. 5 is a flow chart illustrating an embodiment of a process for deploying in a repository new/updated business object classes.

FIG. 5 is a flow chart illustrating an embodiment of a process for deploying in a repository new/updated business object classes. At 502, one or more new and/or updated business object classes and associated registration data are received. The registration includes metadata that enables the repository to associate a request to download a new/updated class with the corresponding class definition stored in the repository. At 504, the new and/or updated class(es) are stored in the repository. In some embodiments, 504 includes storing business object classes that are desired to be available across multiple repositories, e.g., business objects associated with one more services comprising services 402 of FIG. 4, are stored in a separate repository configured to store and make available for download to one or more application servers business logic objects applicable across repositories. Repository-specific business object classes are stored in the repository to which they relate. At 506, a change record in the repository is updated. In some embodiments, 506 includes updating a data value or other indicator associated with the particular class(es) being added and/or updated. Logic at the repository and/or application server reads the data value to determine whether the associated class has been changed since last downloaded by the application server. In some embodiments, 506 includes updating a global change record. In some embodiments, the global change record comprises a timestamp, version stamp, flag, and/or other data indicating that at least one business object class has been added to and/or updated in the repository. In some embodiments, application server logic reads the global change record and if the value has changed since the application server last checked for updates to the business object classes downloaded by the application server previously the application server checks to see if any of the previously downloaded (and/or currently required classes) have been changed or added since the application server last checked for updates and/or originally downloaded the classes.

Figure 6A:
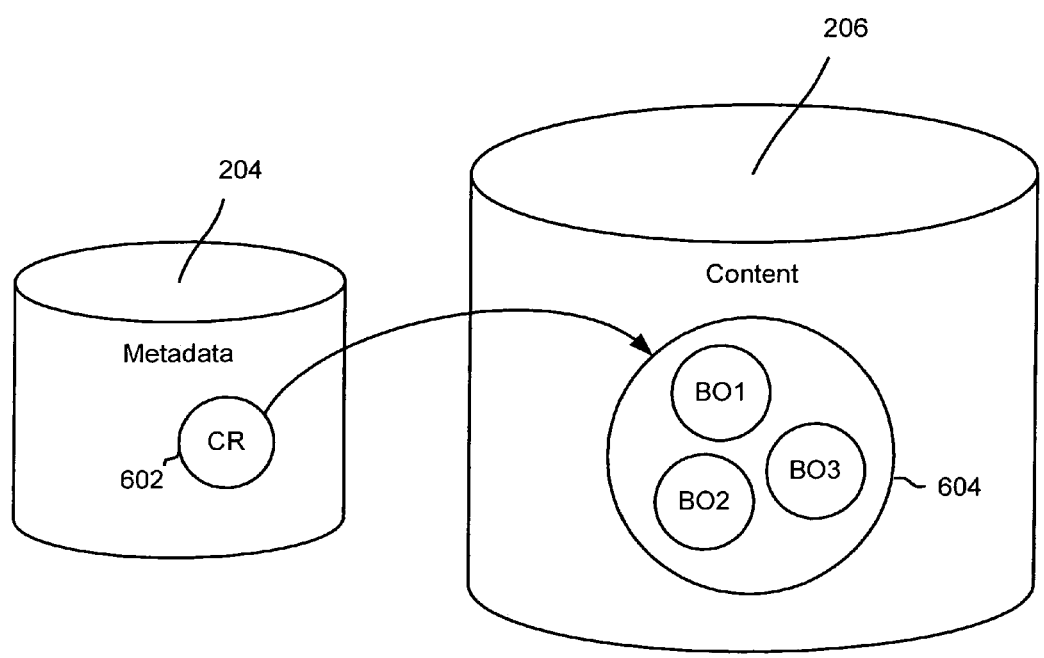
FIG. 6A is a block diagram illustrating an embodiment of a change record.

FIG. 6A is a block diagram illustrating an embodiment of a change record. In the example shown, a change record 602 stored in metadata store 204 is configured to indicate whether and/or when one or more business object classes stored at the repository, e.g., in content store 206, such business objects "BO1", "BO2", and "BO3" in FIG. 6A, and/or one or more collections of classes (e.g., .jar file), represented in FIG. 6A by collection 604, have changed. In some embodiments, each time one or more new and/or updated business object classes are registered at the repository, the change record 602 is updated, e.g., by writing a timestamp, version stamp, and/or other data to the change record.

Figure 6B:
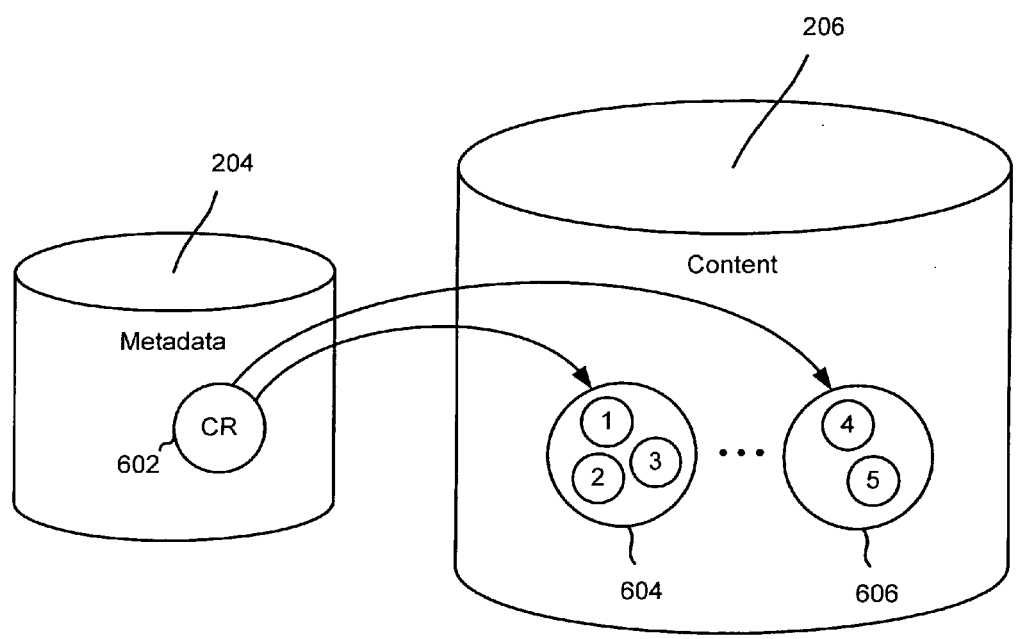
FIG. 6B a block diagram illustrating an embodiment of a global change record.

FIG. 6B a block diagram illustrating an embodiment of a global change record. In this example, change record 602 is updated whenever any one or more of a plurality of collections of object classes, represented in FIG. 6B by collections 604 and 606, and/or one or more components included in one or more such collections, change. In some embodiments, a separate collection and/or business object specific change record or indicator is store for each collection and/or class. In some embodiments, an application server polls the global change record relatively frequently, e.g., every thirty seconds or every minute, etc., and only polls the collection and/or object class specific change records and/or indicators in the event the global change record indicates a new/updated collection/class has been registered at the repository. In some embodiments, frequently checking the global change indicator and only checking for changes to individual collections/classes if the global indicator indicates a change of some sort has occurred enables the application server to check for updates in a computationally efficient manner, and to maintain up-to-date class definitions without constantly checking for updates each time a new business object is required to be instantiated.

Figure 7:
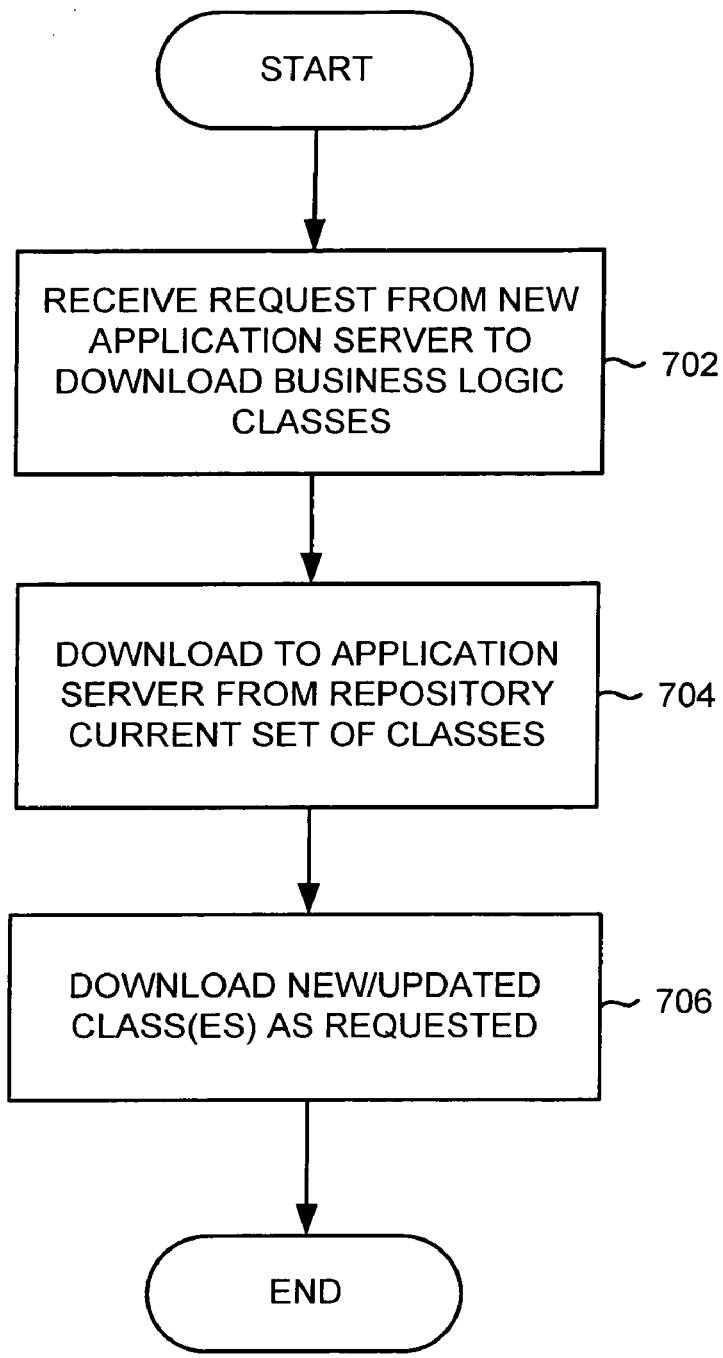
FIG. 7 is a flow chart illustrating an embodiment of a process for distributing business logic classes from a repository.

FIG. 7 is a flow chart illustrating an embodiment of a process for distributing business logic classes from a repository. In some embodiments, the process of FIG. 7 is implemented on a repository, such as content system 110. At 702, a request is received from a newly deployed or redeployed application server to download a base set of business logic classes. At 704, a default, configured, configurable, and/or requested set of business logic classes is downloaded to the application server. At 706, new/updated classes are downloaded to the application server as requested. For example, an application may request that a business logic class not included in the set of classes downloaded at 704, e.g., the first time a need arises to instantiate an instance of the class, such as in response to an associated call from an application running on the application server, or an application server may request that a new or updated class be downloaded, e.g., to replace an older version downloaded previously.

Figure 8:
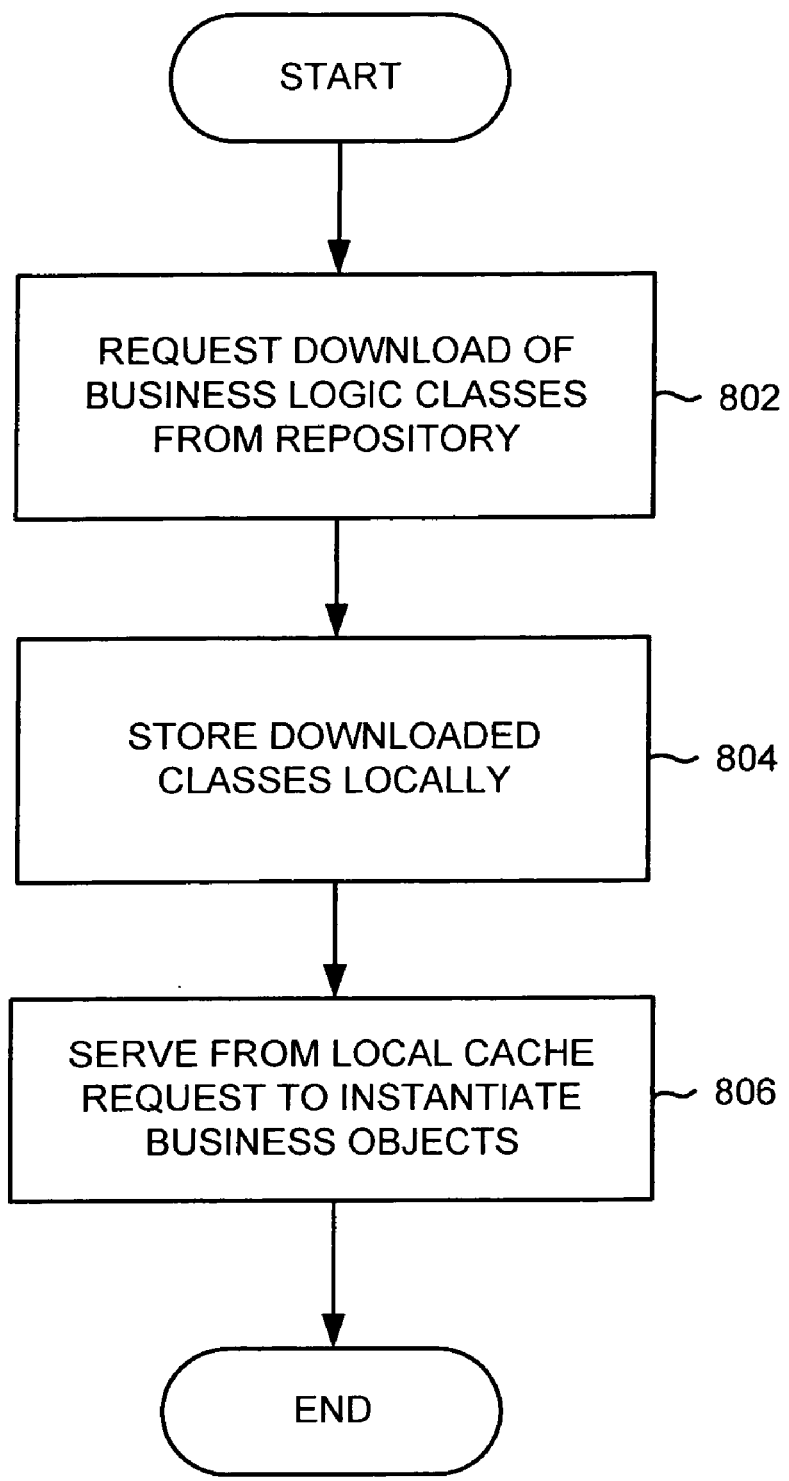
FIG. 8 is a flow chart illustrating an embodiment of a process for downloading business logic classes from a repository.

FIG. 8 is a flow chart illustrating an embodiment of a process for downloading business logic classes from a repository. In some embodiments, the process of FIG. 8 is implemented on an application server, such as application server 108. At 802, the download from a repository of business logic classes is requested. In some embodiments, 802 includes requesting an initial, base set of classes at the time of initial deployment or redeployment of an application server. In some embodiments, 802 includes requesting new and/or update classes, e.g., in response to receiving an indication that new and/or updated classes have been registered at the repository. In some embodiments, 802 includes requesting from a repository one or more business object classes associated with that repository and requesting separately from a shared repository one or more business object classes to be shared, at the application server, across repositories, such as service object classes comprising services 402 of FIG. 4. At 804, downloaded classes are stored locally, e.g., a local cache (e.g., local file or other container or path), on the application server. Application servers configured to access more than one repository in some embodiments download for each repository, from that repository, a set of business object classes to be used in connection with the repository. For each repository, a repository-specific set of business object classes (e.g., type based objects, aspects, modules, etc.) is stored on the application server in a subdirectory associated with that repository. Objects to be shared across repositories are stored in a shared subdirectory or path. At 806, as requests (implicit and/or explicit) requiring that one or more business objects be instantiated are received, the requests are served by using a corresponding class definition stored locally to create the required instance(s). In embodiments, if at 806 it is determined a required class was not downloaded previously, e.g., at 804, the required class is first downloaded from the repository and then the local copy is used to create the instance.

Figure 9:
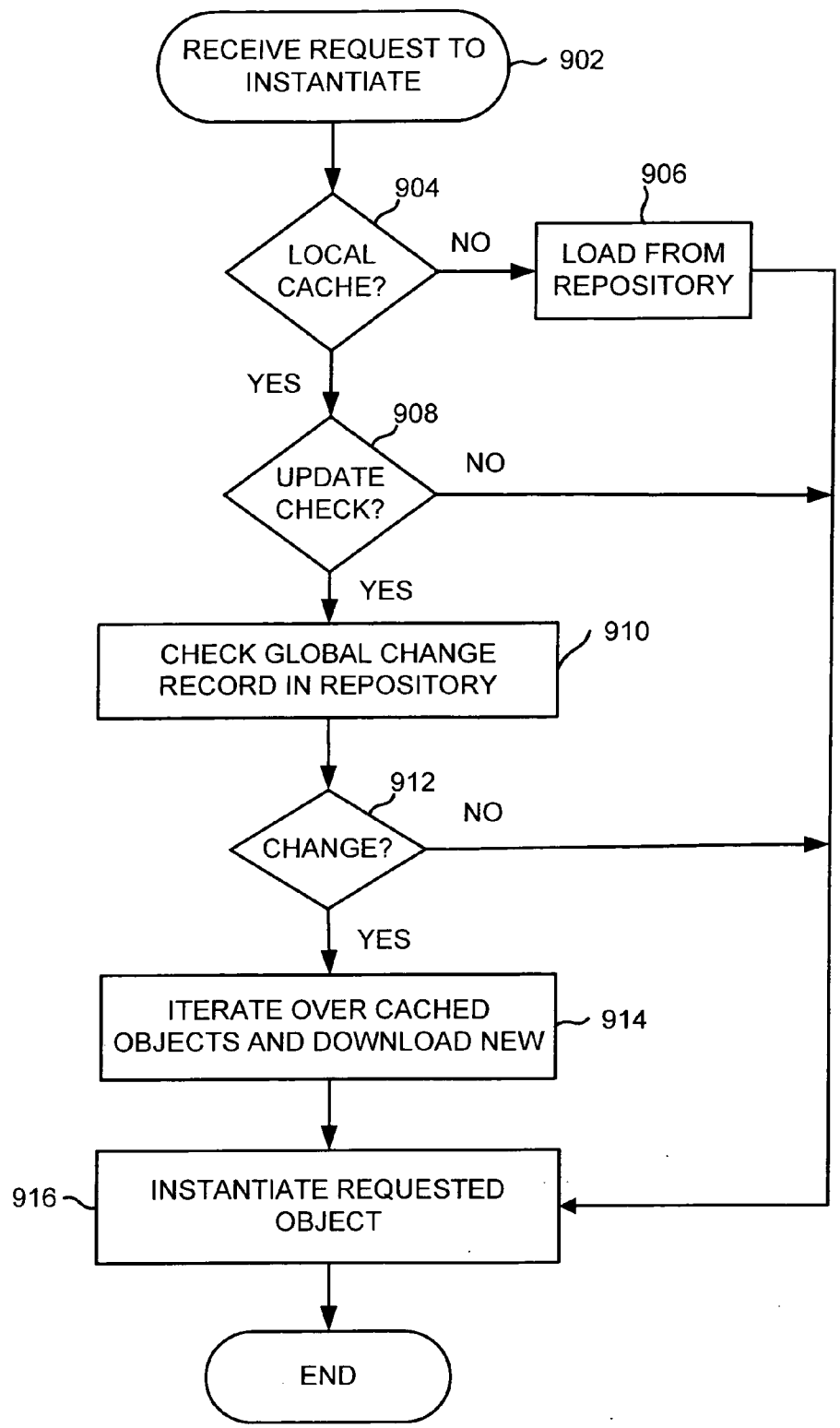
FIG. 9 is a flow chart illustrating an embodiment of a process for using locally stored classes to serve requests to instantiate business objects.

FIG. 9 is a flow chart illustrating an embodiment of a process for using locally stored classes to serve requests to instantiate business objects. In some embodiments, the process of FIG. 9 is implemented on an application server such as application server 108. In some embodiments, 806 of FIG. 8 includes the process of FIG. 9. At 902, a request to instantiate a business object is received. At 904, it is determined whether the requested class is available in the local class. If not, at 906 the class is downloaded from the repository and used at 916 to create the requested instance. If the class is available locally (e.g., was downloaded previously), at 908 it is determined whether it is time to check with the repository for business object class updates. In some embodiments, 908 includes checking if a timer has expired. If it is not time to check for updates, the locally stored copy of the class is used at 916 to create the requested instance. If the time for checking updates has arrived, at 910 a global change record at the repository is checked. At 912 it is determined whether the global change record indicates that one or more new and/or updated classes have been registered at the repository since the application server last checked and/or downloaded classes. In some embodiments, 912 includes comparing a value, such as a timestamp, version stamp, flag, etc. with a previously stored corresponding value read and stored the last time classes were downloaded and/or checked for updates. If the global change record does not indicate that new/updated classes have been registered at the repository, the locally stored copy of the class is used at 916 to create the requested instance. If the global change record indicates that one or more classes have been added to and/or updated at the repository since the last time the application server downloaded classes and/or updates and/or checked for changes, at 914 the application server iterates over all previously downloaded classes and checks a corresponding data in the repository, e.g., a class or collection of class specific change record and/or date value or other indicator, and downloads a new/updated definition for any previously downloaded and/or currently required class(es) for which a new and/or updated definition has been registered at the repository. Once the checking for and/or downloading of updates at 914 is completed with respect to at least the class requested at 902, the locally stored (and if applicable updated) copy of the class is used at 916 to create the requested instance.

In some embodiments, class loading precedence rules are modified and/or configured to ensure applications running on a content management system framework, platform, and/or system properly download business object classes from an associated repository and that no conflicts between inconsistent versions of the same class and/or between otherwise incompatible classes result. In the JAVA 2 Platform Enterprise Edition (J2EE), for example, a class loader hierarchy is established in which a set of classes basic to the platform are loaded by a "bootstrap" class loader having no parent, and other class loaders of increasing specificity descend as children or grandchildren, etc. of that class loader. In the default configuration, a class loader has visibility in only one direction, toward its parents, grandparents, etc., and is configured to look to such parent class loaders first to find a definition to use to create a requested instance of a class. In some embodiments, the precedence rule by which a class loader looks first to its parent (which in turn looks first to its own parent, etc., as applicable) to obtain needed classes is modified to ensure that the class loader looks first to its own local cache of class definitions to service requests to create an object instance, and only delegates to a parent class loader if the class is not available locally. The J2EE standard, for example, contemplates such a precedence rule being configured at the web application level, to enable each web application to maintain its own set of classes separate from each other web application running on the application server and from the classes managed and used by the application server itself. In some embodiments, the precedence rules at a level lower than the application level are modified to configure a class loader at such a lower level to look first to its local cache prior to looking to a parent class loader. While not contemplated by the J2EE standard for other than web application class loaders, in some embodiments using this approach, e.g., at the application framework/system level, facilitates "sandboxing" at that level, making it easier to avoid so-called "jar conflicts", such as could arise if an incompatible version of a class were loaded in a visible class loader.

Figure 10:
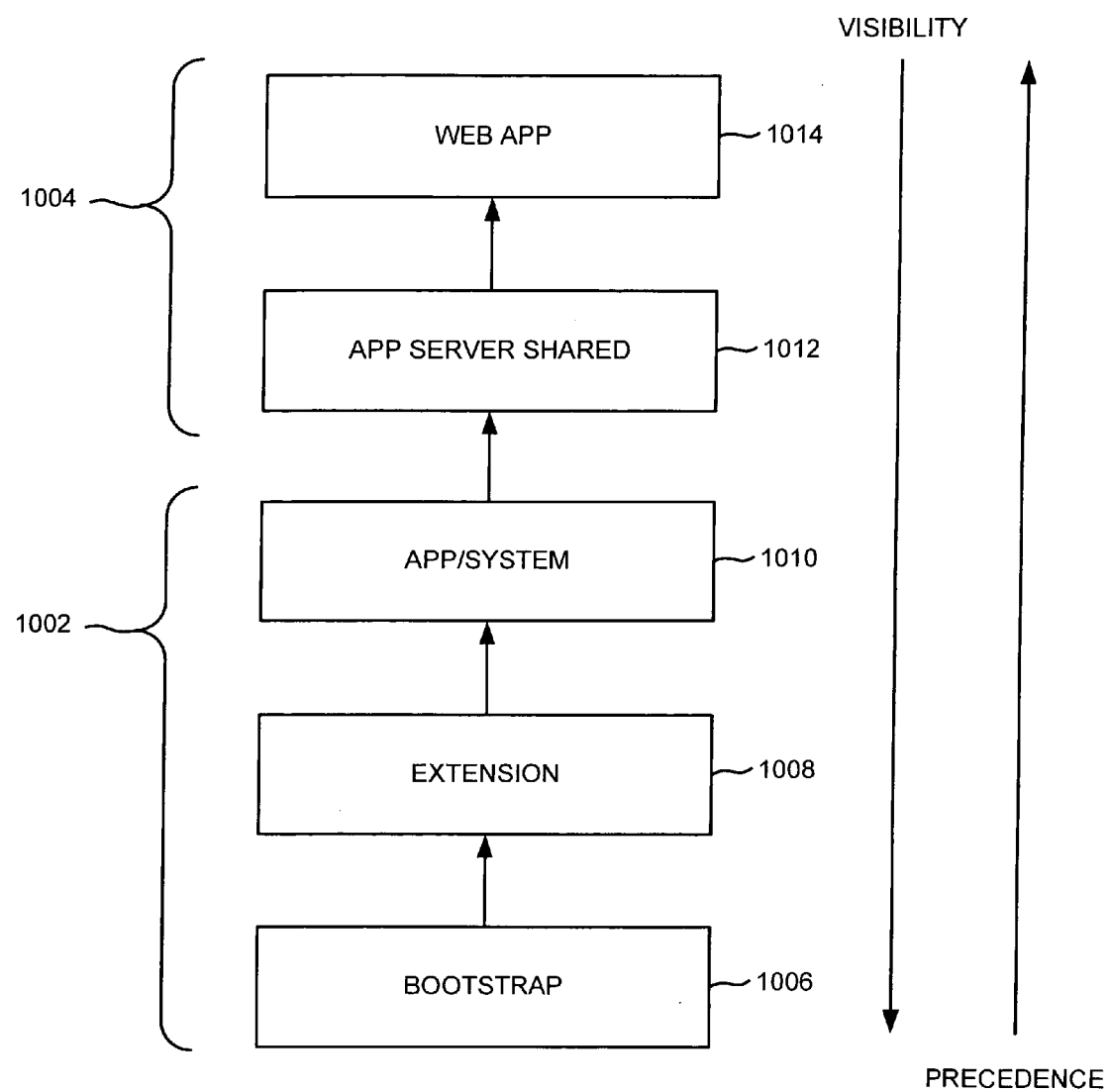
FIG. 10 is a block diagram illustrating an embodiment of a class loader hierarchy with modified precedence.

FIG. 10 is a block diagram illustrating an embodiment of a class loader hierarchy with modified precedence. In the example shown, a set of hardware and/or operating system vendor class loaders 1002 and a set of application server associated class loaders 1004 comprise a hierarchy of class loaders that includes a bootstrap class loader 1006 that has no parent, an "extension" class loader 1008 that is a child of bootstrap class loader 1006, an application framework/system level class loader 1010 that is a child of extension class loader 1008, application server shared class loader 1012 that is a child of application framework/system level class loader 1010, and one or more web application class loaders 1014 that are children of application server shared class loaders 1012. In a default configuration, at each level other than the web application class loader level a class loader looks first to its parent to obtain a class definition (which parent would in turn look first to its parent, and so on), and only to its own cache if the parent does not have and/or cannot obtain the class. A child can only "see" classes available via a parent, and has no visibility of the classes available to/from a child. In some embodiments, one or more class loaders (not shown in FIG. 10; see FIG. 11) of which the application framework/system level class loader 1010 is a parent/grandparent are configured to look first to their local cache for a class definition, and only to delegate to a parent level class loader if the required class is not available and/or cannot be obtained (e.g., from a repository) by the application framework/system level class loader. In some embodiments, this modification of the class loader precedence rules facilitates sandboxing, thereby making it easier to avoid conflicts between classes.

Figure 11:
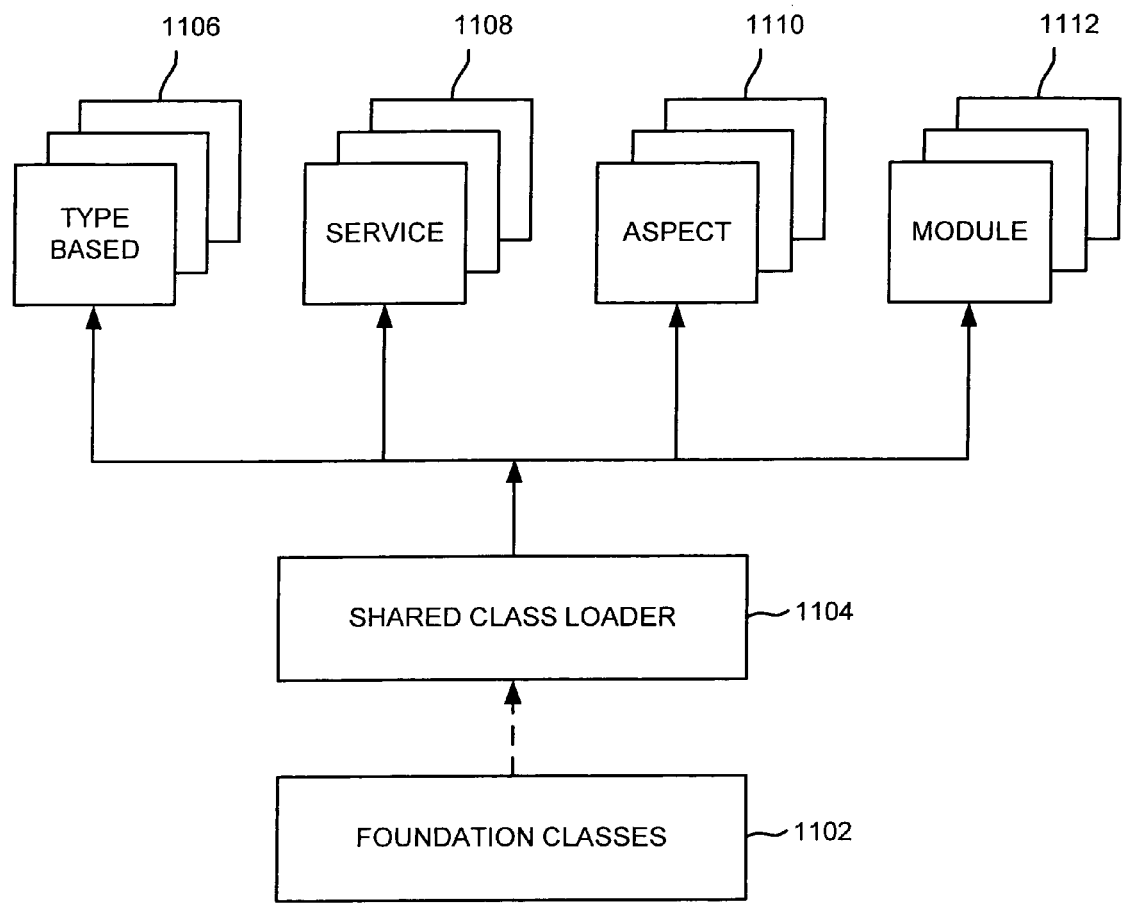
FIG. 11 is a block diagram illustrating an embodiment of a set of class loaders that are children/grandchildren of the application framework/system level class loader.

FIG. 11 is a block diagram illustrating an embodiment of a set of class loaders that are children/grandchildren of the application framework/system level class loader. In some embodiments, the class loaders shown in FIG. 11 are created by a content management framework running on an application server, such as foundation classes 1102, to manage the process of initially downloading and subsequently updating business object classes deployed from a repository. In the example shown, foundation classes 1102 has created an instance of a shared class loader 1104. In some embodiments, shared class loader 1104 is configured to downloaded one or more business object interfaces and/or shared dependent jars (files referenced and/or otherwise used by one or more business object classes), analogous to a library of shared components, and includes an interface visible to one or more applications and configured to receive and service requests from the one or more applications to instantiate business objects. The shared class loader 1104 in turn has created (e.g., downloaded and instantiated) one or more type based object class loaders 1106, one or more service object class loaders 1108, one or more aspect object class loaders 1110, and one or more module object class loaders 1112. In this example, a separate class loader has been provided for each component (business object class) downloaded from the repository. A separate class loader is created for each component (business object) downloaded from the repository to segregate (sandbox) each component from each other component, e.g., so that problems do not result from the use by different components of incompatible versions of the same object, etc. In some embodiments, each of the component class loaders 1106-1112 is configured to look first to its own cache of stored classes and, if a required class is not available, then to shared class loader 1104. In some embodiments, if a class is not available to shared class loader 1104 in a local cache, shared class loader 1104 requests the class, if available, from an associated repository. If the class is not available locally or for download from the repository, only then does the share class loader look to its parent class loader (e.g., application framework/system level class loader 1010 in the example shown in FIG. 10) to obtain the class.

Typically loading new/updated business object classes would require that at least the web application be restarted. On restart, the application typically would identify and subsequently use as required any updated software classes. However, in many cases continuous or near continuous access to applications and/or associated managed content is essential to an enterprise or other organization served by a content management system, including the enterprise's own employees, customers, vendors, suppliers, partners, contractors, etc. As a result, in some embodiments new/updated business logic and/or other software objects comprising a content management framework are downloaded from an associated repository and "hot deployed", without requiring that the application be restarted or otherwise unavailable for any significant period of time.

Figure 12:
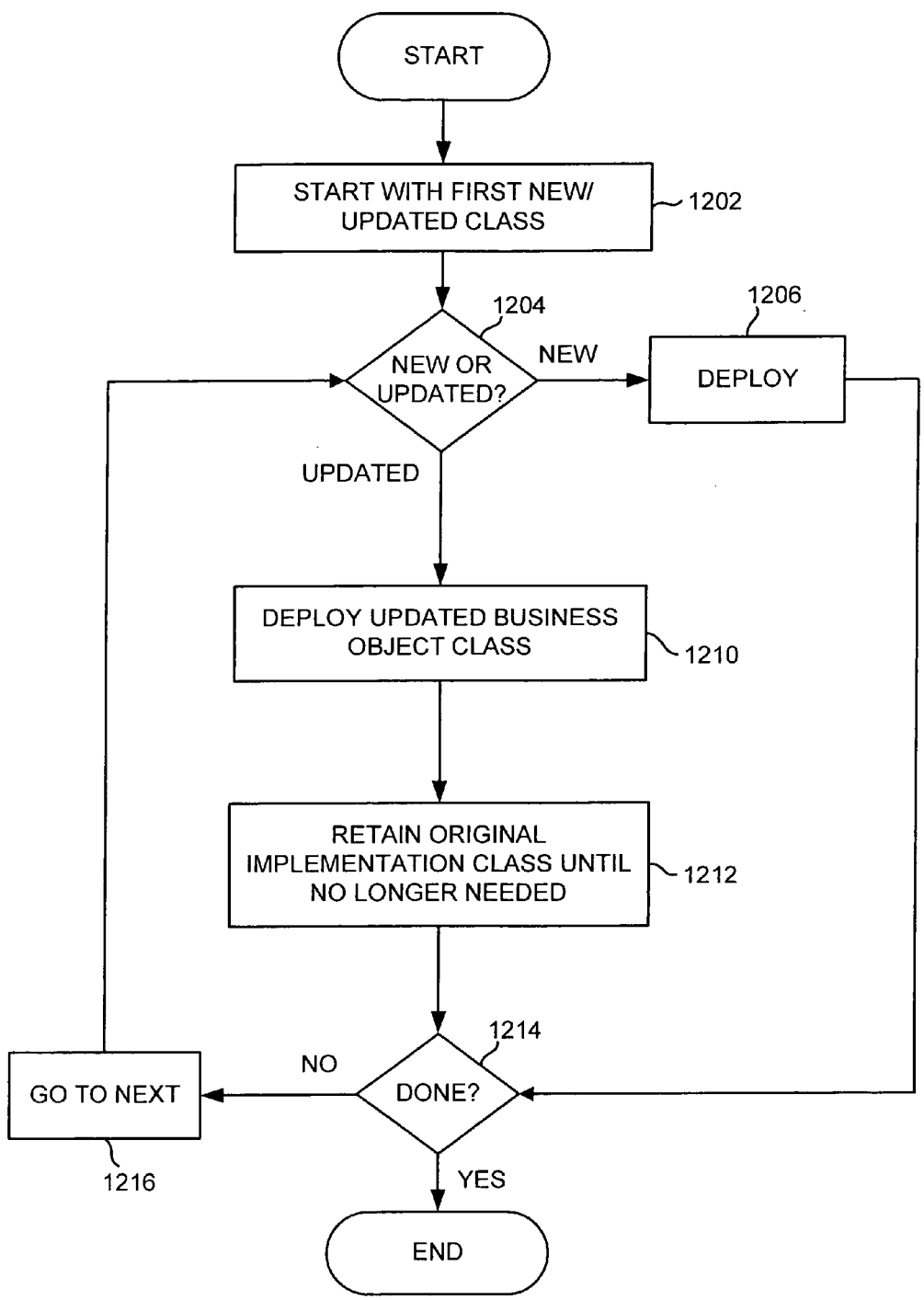
FIG. 12 is a flow chart illustrating an embodiment of a process for hot deploying new and/or updated business object classes.

FIG. 12 is a flow chart illustrating an embodiment of a process for hot deploying new and/or updated business object classes. In some embodiments, the process of FIG. 12 is implemented on an application server to deploy new and/or updated business object classes downloaded from an associated repository. At 1202, deployment begins with a first new/updated class. At 1204, it is determined whether the class is new or an update (modification) to a previously downloaded class. If the class is new, at 1206 it is deployed by storing a copy in a local cache and using the local copy to create instances as requested and/or required. If the class is an update to a previously downloaded class, at 1210 the updated business object class is deployed and used to instantiate subsequently requested instances of the business object class. At 1212, the original (superseded) business object class is retained until no longer needed. In some embodiments, the superseded business object class is retained until there is no longer an actively referenced and/or otherwise used business object that was instantiated based on the superseded business object class. In some embodiments, hot deployment of an updated business object class while retaining at least for a time a superseded version of the business object class is provided at least in part by configuring code associated with a framework on which one or more applications are running, such as business object framework 304 and/or foundation classes 306 of FIG. 3, to receive from one or more applications, such as application(s) 302 of FIG. 3, and process requests to instantiate business objects, including as shown in FIG. 12 with respect to new or updated business object classes. In some embodiments, an application running on the framework does not request new business object instances directly from an underlying runtime environment (e.g., JAVA) ultimately used to instantiate business objects, but instead requests that the framework cause such business object instances to be created. The applications request a business object by name, and code associate with the framework maps each request to an associated business object class and causes the runtime environment to create an instance. In this way, the application(s) can continue to use the same name to request an instance of a business object both before and after an updated business object class has been deployed— each such request would be served by the framework using the original class prior to an update being deployed and using the updated class subsequent to an update being deployed—thereby avoiding the need to restart an application in order to configure it request instances based on the updated class. Instead, the update is transparent to the application, which continues to request (from the framework) the business object using the same name as before the update. Once a new or updated business object class has been hot deployed, it is determine at 1214 whether any more business object classes remain to be deployed. If so, a next class is selected for deployment at 1216 and 1204-1214 are repeated, as applicable, as described above. Once the last business object class has been deployed (1214), the process of FIG. 12 ends.

Hot deployment of new/updated business object classes as described above enables updated classes downloaded from a repository to be deployed with minimal impact on application server and/or individual business object availability.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of deploying computer code, comprising:
   receiving at a first repository a software object class, wherein the first repository is associated with a content management system and comprises a content store and a corresponding metadata store;
   storing the software object class in the content store associated with the first repository; and
   downloading the software object class from the first repository to an application server associated with an application content data stored at the content store of the first repository and a content store of a second repository, wherein downloading the software object class from the first repository is based at least in part on a determination that the software object class has not been previously downloaded from the first repository to the application server, wherein the downloading further comprises: determining by the application server if the software object class is not available in a local cache, if it is not available, checking a shared class loader in the local cache, the shared class loader requesting the software object class from the first repository, and if the software object class is not available for download from the first repository, the shared class loader looks to its parent class loader to obtain the software object class, wherein an application at the application server is configured to use the software object class downloaded from the first repository to perform an operation with respect to the application content data stored at the content store of the first repository, and wherein the application at the application server is configured to use another software object class downloaded from a second repository to perform an operation with respect to the application content data stored at the content store of the second repository, wherein the first repository and second repository are different.

2. A method as recited in claim 1, further including receiving a registration data associated with the software object class.

3. A method as recited in claim 2, further including storing at least a part of said registration data at the first repository.

4. A method as recited in claim 3, wherein said at least a part of said registration data is stored in the metadata store associated with the first repository.

5. A method as recited in claim 1, wherein the software object class is downloaded to the application server in response to a request received from the application server.

6. A method as recited in claim 1, wherein the software object class comprises one or a plurality of software object classes received and stored at the first repository.

7. A method as recited in claim 6, wherein the software object class comprises one of at least a subset of said plurality of software object classes requested to be downloaded to the application server.

8. A method as recited in claim 1, wherein the application server comprises a first application server associated with the first repository and the method further comprises downloading the software object class to a second application server associated with the first repository.

9. A method as recited in claim 1, wherein the first repository comprises a shared repository configured to store and distribute one or more software object classes to be used by the application server to access content across two or more other repositories.

10. A method as recited in claim 1, wherein the software object class comprises a business object class.

11. A method as recited in claim 1, wherein the software object class comprises part of a content management framework.

12. A method as recited in claim 1, wherein the software object class comprises a component available to be used by an application running on the application server to perform a content management function with respect to content stored in the first repository.

13. A method as recited in claim 1, wherein the software object class is hot deployed on the application server.

14. A method as recited in claim 1, further comprising providing an indication that the software object class has been added to or updated in the first repository.

15. A method as recited in claim 14, wherein the application server requests the software object class based at least in part on the indication that the software object class has been added to or updated in the first repository.

16. A content management system, comprising:
   a data storage device; and
   a processor coupled to the data storage device and configured to:
      receive a software object class, wherein a first repository is associated with the content management system and comprises a content store and a corresponding metadata store;
      store the software object class on the data storage device in the content store associated with the first repository; and
      download the software object class from the first repository to an application server associated with an application content data stored at the content store of the first repository and a content store of a second repository, wherein downloading the software object class from the first repository is based at least in part on a determination that the software object class has not been previously downloaded from the first repository to the application server, wherein the downloading further comprises: determining by the application server if the software object class is not available in a local cache, if it is not available, checking a shared class loader in the local cache, the shared class loader requesting the software object class from the first repository, and if the software object class is not available for download from the first repository, the shared class loader looks to its parent class loader to obtain the software object class, wherein an application at the application server is configured to use the software object class downloaded from the first repository to perform an operation with respect to the application content data stored at the content store of the first repository, and wherein the application at the application server is configured to use another software object class downloaded from a second repository to perform an operation with respect to the application content data stored at the content store of the second repository, wherein the first repository and second repository are different.

17. A system as recited in claim 16, wherein the processor and the data storage device are associated with the first repository with which the application server is associated.

18. A computer readable storage medium for deploying computer code, the computer readable storage medium being embodied in a computer readable medium and comprising computer instructions for:
- receiving at a first repository a software object class, wherein the first repository is associated with a content management system and comprises a content store and a corresponding metadata store;
- storing the software object class in the content store associated with the first repository; and
- downloading the software object class from the first repository to an application server associated with an application content data stored at the content store of the first repository and a content store of a second repository, wherein downloading the software object class from the first repository is based at least in part on a determination that the software object class has not been previously downloaded from the first repository to the application server, wherein the downloading further comprises: determining by the application server if the software object class is not available in a local cache, if it is not available, checking a shared class loader in the local cache, the shared class loader requesting the software object class from the first repository, and if the software object class is not available for download from the first repository, the shared class loader looks to its parent class loader to obtain the software object class, wherein an application at the application server is configured to use the software object class downloaded from the first repository to perform an operation with respect to the application content data stored at the content store of the first repository, and wherein the application at the application server is configured to use another software object class downloaded from a second repository to perform an operation with respect to the application content data stored at the content store of the second repository, wherein the first repository and second repository are different.

* * * * *